United States Patent
Klasing et al.

(10) Patent No.: US 7,249,928 B2
(45) Date of Patent: Jul. 31, 2007

(54) TURBINE NOZZLE WITH PURGE CAVITY BLEND

(75) Inventors: Kevin Samuel Klasing, Springboro, OH (US); Scott Michael Carson, Mason, OH (US)

(73) Assignee: General Electric Company, Schenectady, NY (US)

( * ) Notice: Subject to any disclaimer, the term of this patent is extended or adjusted under 35 U.S.C. 154(b) by 158 days.

(21) Appl. No.: 10/907,476

(22) Filed: Apr. 1, 2005

(65) Prior Publication Data

US 2007/0128021 A1   Jun. 7, 2007

(51) Int. Cl.
 *F01D 25/12* (2006.01)
(52) U.S. Cl. .................. 415/115; 415/191; 415/199.5; 415/211.2; 416/193 A
(58) Field of Classification Search ........... 415/115, 415/191, 199.5, 211.2; 416/193 A
See application file for complete search history.

(56) References Cited

U.S. PATENT DOCUMENTS

| | | | |
|---|---|---|---|
| 3,854,842 A * | 12/1974 | Caudill | 415/116 |
| 4,348,157 A | 9/1982 | Campbell et al. | |
| 5,181,728 A * | 1/1993 | Stec | 277/355 |
| 5,252,026 A * | 10/1993 | Shepherd | 415/115 |
| 6,142,734 A | 11/2000 | Lee | |
| 6,183,192 B1 | 2/2001 | Tressler et al. | |
| 6,354,797 B1 | 3/2002 | Heyward et al. | |
| 6,375,419 B1 | 4/2002 | LeJambre et al. | |
| 6,425,738 B1 | 7/2002 | Shaw | |
| 6,524,070 B1 | 2/2003 | Carter | |
| 6,579,061 B1 | 6/2003 | Heyward et al. | |
| 6,830,432 B1 | 12/2004 | Scott et al. | |

FOREIGN PATENT DOCUMENTS

| | | |
|---|---|---|
| EP | 1 149 984 A | 10/2001 |
| GB | 2 032 531 A | 5/1980 |
| GB | 2233401 A | 1/1991 |
| GB | 2 281 356 A | 8/1993 |

* cited by examiner

*Primary Examiner*—Ninh H. Nguyen
(74) *Attorney, Agent, or Firm*—Adams Evans P.A.; William Scott Andes

(57) ABSTRACT

A turbine nozzle for a gas turbine engine includes a nozzle segment having an airfoil-shaped vane with a root, a tip, a leading edge, a trailing edge and opposed curved pressure and suction sides. An arcuate inner band segment is attached to the root of the vane. The inner band segment includes an inner flowpath surface bounded at forward and aft ends thereof by a forward-facing surface and an aft-facing surface, respectively. A convex curved blended corner is formed between the inner flowpath surface and the aft-facing surface.

8 Claims, 5 Drawing Sheets

TURBINE NOZZLE WITH PURGE CAVITY BLEND

STATEMENT OF GOVERNMENT RIGHTS

The Government has certain rights to this invention pursuant to Contract No. NAS3-01135 awarded by the National Air and Space Administration.

BACKGROUND OF THE INVENTION

This invention relates generally to gas turbine components, and more particularly to stationary turbine airfoils.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In a turbofan engine, which typically includes a fan placed at the front of the core engine, a high pressure turbine powers the compressor of the core engine. A low pressure turbine is disposed downstream from the high pressure turbine for powering the fan. Each turbine stage commonly includes a stationary turbine nozzle followed in turn by a turbine rotor. The turbine nozzle comprises a row of circumferentially side-by-side nozzle segments each including one or more stationary airfoil-shaped vanes mounted between inner and outer band segments or "platforms" for channeling the hot gas stream into the turbine rotor. The turbine rotor comprises a row of circumferentially side-by-side airfoil-shaped blades with arcuate platforms.

It is well known that a vortex flow, referred to as a "horseshoe" vortex because of its shape, occurs around the turbine airfoils (i.e. both blades and vanes) near the inner and outer platforms in vanes and near the inner platform and tip for blades. The strength of the vortex has a direct affect on the airfoil performance, and therefore, the performance of the turbine as a whole. As the vortex strength increases, the performance of the turbine decreases. The performance impact is greatest if the vortex system migrates to the suction side of the airfoil and then up the span towards the middle of the airfoil. Accordingly, there is a need for a turbine airfoil which reduces the strength of the vortex system or inhibits the cross-passage migration of the vortex system.

BRIEF SUMMARY OF THE INVENTION

The above-mentioned need is met by the present invention, which according to one aspect provides a turbine nozzle for a gas turbine engine, including: a nozzle segment having: an airfoil-shaped vane having a root, a tip, a leading edge, a trailing edge and opposed curved pressure and suction sides; and an arcuate inner band segment attached to said root of said vane, said inner band segment including an inner flowpath surface bounded at forward and aft ends thereof by a forward-facing surface and an aft-facing surface, respectively; wherein a convex curved blended corner is formed between said inner flowpath surface and said aft-facing surface.

According to another aspect of the invention, a turbine assembly for a gas turbine engine includes: a nozzle segment including: an airfoil-shaped vane having a root, a tip, a leading edge, a trailing edge and opposed pressure and suction sides; and an arcuate inner band attached to the root of the vane, the inner band including an inner flowpath surface bounded at forward and aft ends thereof by a forward-facing surface and an aft-facing surface, respectively; and a rotatably-mounted turbine blade disposed aft of and in flow communication with the nozzle segment, the turbine blade including an arcuate blade platform defining a second inner flowpath surface. A purge cavity is defined between the nozzle segment and the turbine blade, the purge cavity in flow communication with a secondary flowpath of the engine. The juncture of the inner flowpath surface and the aft-facing surface of the inner band is contoured so as to induce swirling vane flow into said purge cavity.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
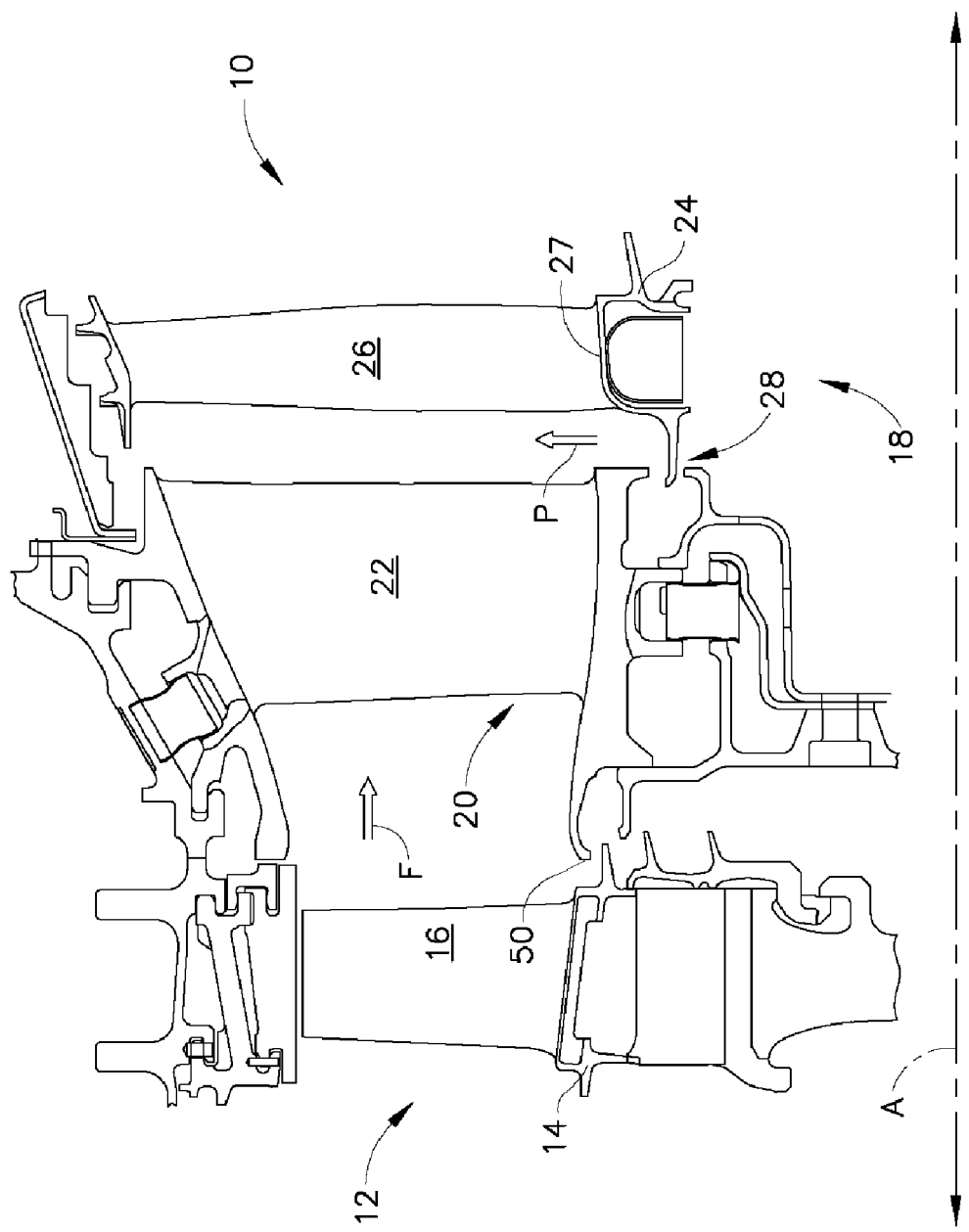
FIG. 1 is a side view of a portion of a prior art turbine section.

Referring to the drawings wherein identical reference numerals denote the same elements throughout the various views, FIG. 1 illustrates a portion of a prior art gas turbine engine turbine section 10 including, in serial flow communication, a high pressure turbine (HPT) 12 including an HPT rotor 14 carrying a plurality of HPT blades 16, a low pressure turbine (LPT) 18 including an LPT nozzle 20 comprising a plurality of stationary vanes 22, and an LPT rotor 24 carrying a plurality of LPT blades 26 with arcuate platforms 27 all disposed coaxially about a longitudinal or axial centerline axis "A". High pressure gases from a combustor (not shown) are discharged to the high pressure turbine 12 where they are expanded so that energy is extracted. The hot gases then flow to the low pressure turbine 18 where they are expanded further. The high pressure turbine 12 drives a conventional high pressure compressor through a high pressure shaft (not shown), and the low pressure turbine 22 drives a conventional fan through a low pressure shaft (not shown). The present invention is described with particular reference to the LPT nozzle 20 and LPT blades 26, however it is equally applicable to other turbomachinery airfoils, for example HPT airfoils.

The space between the LPT nozzle 20, and the LPT rotor 24, referred to as a purge cavity 28, is not sealed and is exposed to the hot primary flowpath gases. If combustion gases flow radially inward between the LPT nozzle 20 and the LPT rotor 24, they can overheat the engine components they come in contact with and substantially reduce component life. Therefore, the purge cavity 28 is provided with a secondary air flow of relatively cooler air which is at a higher pressure than the gases in the primary flow path "F". This ensures an outward purge flow, as shown by the arrow "P" in FIG. 1, and prevents ingestion of flowpath air. This outward purge flow results in an efficiency loss in the LPT 18, by increasing the size of the vortex shedding off the blade leading edge near the platform.

Figure 2:
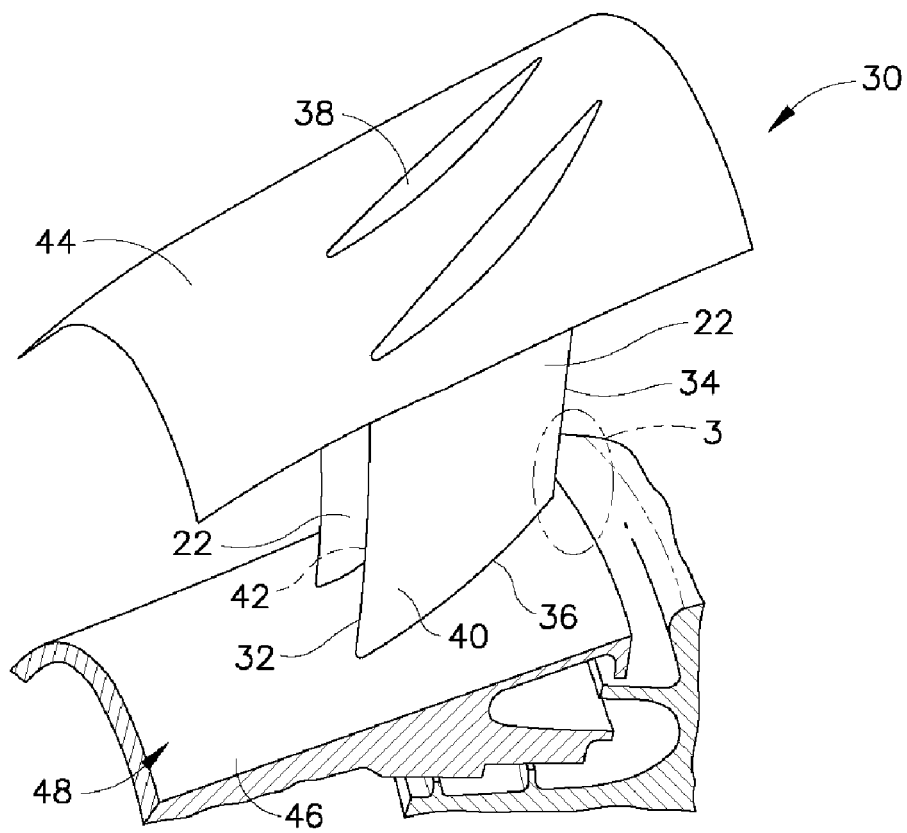
FIG. 2 is a perspective view of a prior art turbine nozzle.

As shown in FIG. 2, The LPT nozzle 20 is typically built up from a plurality of circumferentially adjoining nozzle segments 30 that collectively form a complete 360° assembly. Each LPT nozzle segment 30 includes one or more of the airfoil-shaped vanes 22 each having a leading edge 32, a trailing edge 34, a root 36, a tip 38, and spaced-apart pressure and suction sides 40 and 42, respectively. An arcuate outer band 44 is attached to the tip 38 of the vane 22. An arcuate inner band 46 is attached to the root 36 of the vane 22. The inner band has a flowpath surface 48, an axially-forward facing surface 50 at its forward end, and an axially-aft facing surface 52 at its aft end. The outer and inner bands 44 and 46 of each nozzle segment 30 define the outer and inner radial boundaries, respectively, of the gas flow through the nozzle segment 30.

Figure 3:
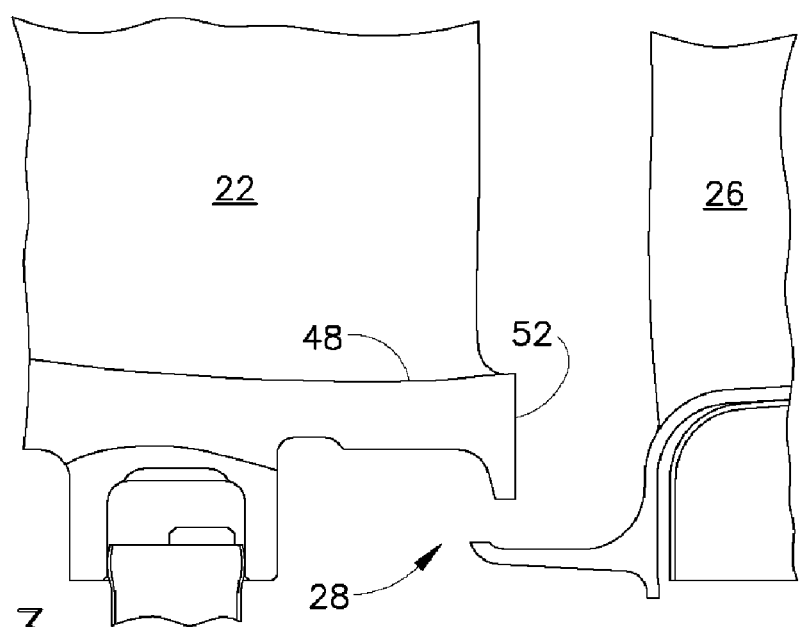
FIG. 3 is an enlarged side view of a portion of FIG. 2.
Figure 4:
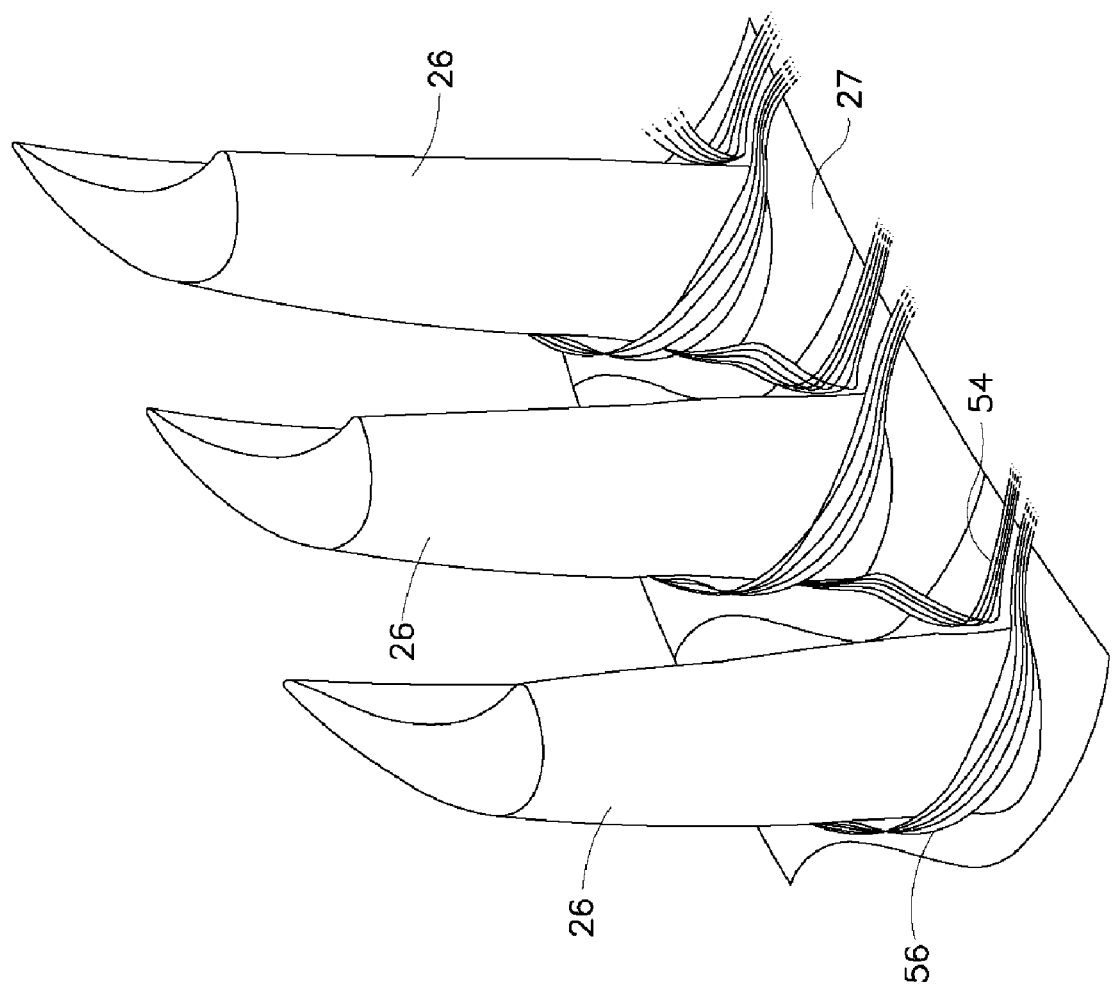
FIG. 4 is a front perspective view of a flow pattern around a turbine blade positioned downstream from the nozzle of FIG. 2.
Figure 5:
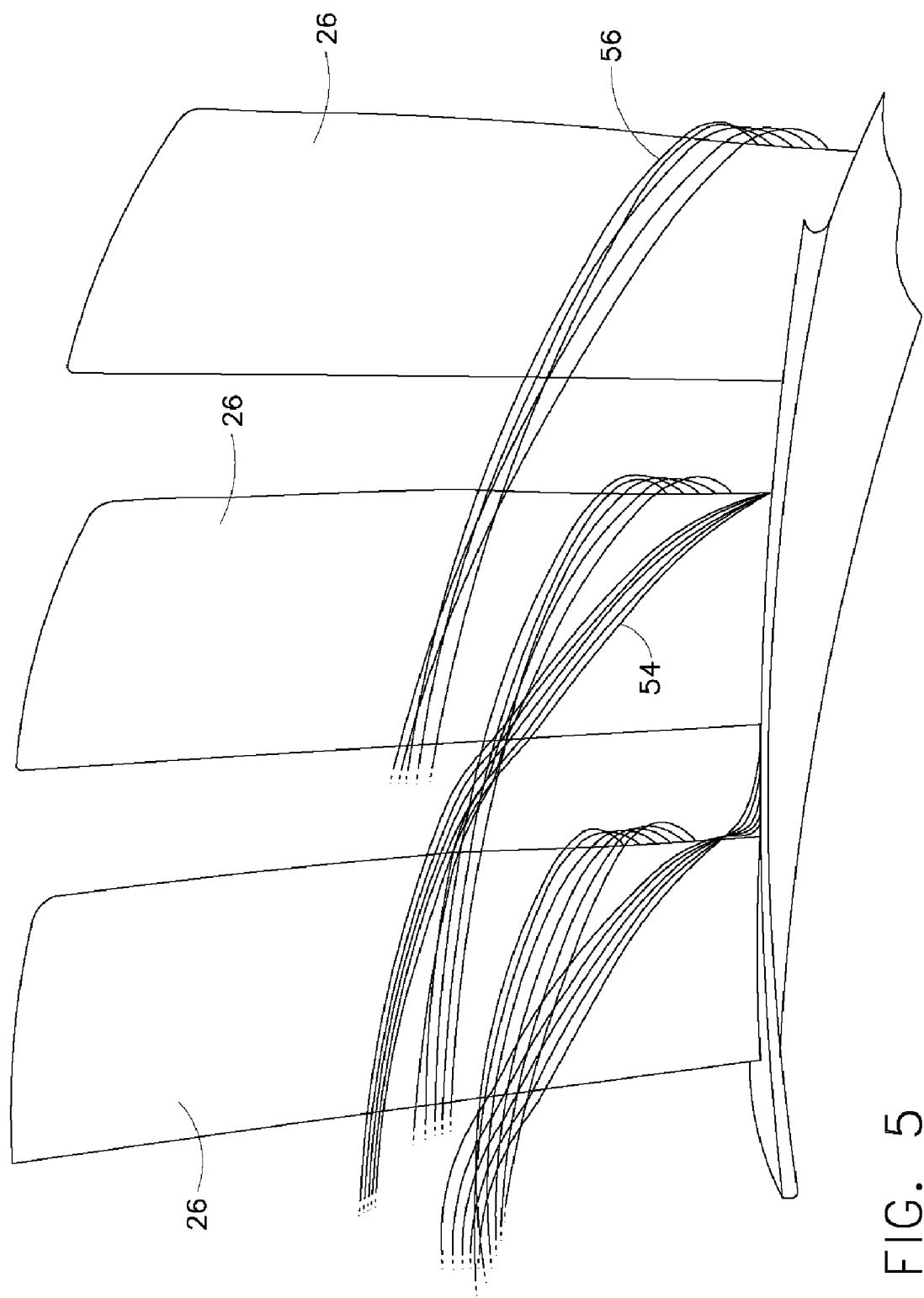
FIG. 5 is a rear perspective view of a flow pattern around a turbine blade positioned downstream from the turbine nozzle of FIG. 2.

FIG. 3 illustrates the LPT vane inner band geometry in more detail. The transition between the flowpath surface 48 and the aft-facing surface 52 presents a relatively sharp corner. Some prior art LPT nozzle segments 30 include a "break edge" at this location, but the radius of this feature is typically in the range of about 0.0762 mm (0.003 in.) to about 0.038 mm (0.015 in.) The axially aft-facing surface 52 thus presents a rearward-facing discontinuity or "step". During engine operation, this flow feature causes a relatively large drop in the local static pressure field. The purge flow as affected by this sudden pressure drop interacts with and aggravates pressure and suction side horseshoe vortices 54 and 56 that start at the LPT blade 26, allowing the horseshoe vortices 54 and 56 to move radially outwards towards a mid-span position on the LPT blade 26 as shown in FIGS. 4 and 5.

Figure 6:
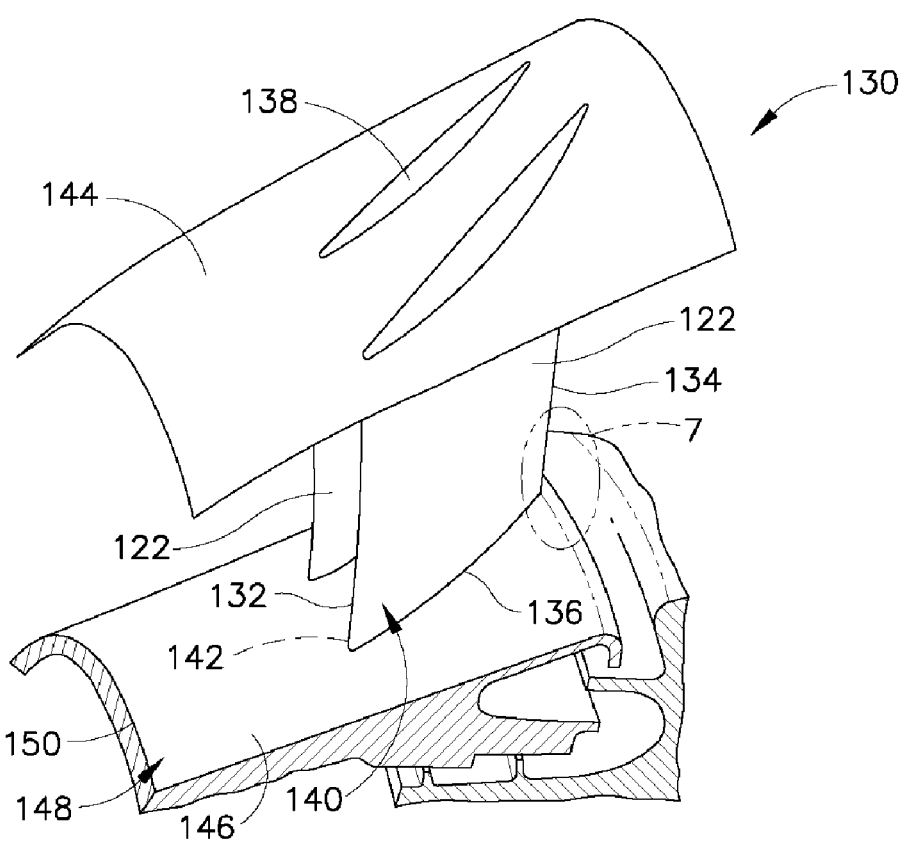
FIG. 6 is a perspective view of a turbine nozzle constructed in accordance with the present invention.

An LPT nozzle segment 130 constructed according to the present invention is shown in FIG. 6. The LPT nozzle segment 130 is similar in overall construction to the prior art LPT nozzle segment 30 and includes one or more airfoil-shaped vanes 122 each having a leading edge 132, a trailing edge 134, a root 136, a tip 138, and spaced-apart pressure and suction sides 140 and 142, respectively. An arcuate outer band 144 is attached to the tip 138 of the vane 122. An arcuate inner band 146 is attached to the root 136 of the vane 122. The inner band 146 has a flowpath surface 148, an axially-forward facing surface 150 at its forward end, and an axially-aft facing surface 152 at its aft end.

Figure 7:
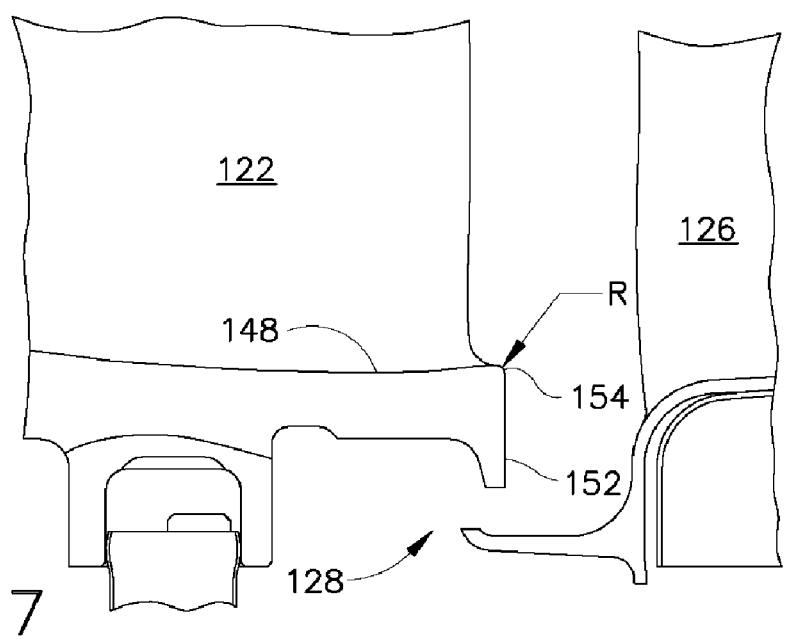
FIG. 7 is an enlarged side view of a portion of FIG. 6.

As shown in more detail in FIG. 7, a blended corner 154 having a convex curvature extends between the flowpath surface 148 and the axially-aft facing surface 152 and provides a gradual transition instead of a "step" as described above. By adding the blended corner 154 to the inner band 146, highly swirled vane flow is "induced" into the purge cavity 128 and helps to increase the swirl velocity of the purge flow from the secondary flow system before the purge flow is introduced to the primary flow path (i.e. to the downstream blade passage). Increasing the swirl in the purge cavity 128 will serve to reduce the strength of the horseshoe vortices 54 and 56 formed at the blade LE hub and will therefore increase LPT blade efficiency.

In the illustrated example, the cross-sectional shape of the blended corner 154 is a curve with a circular radius "R" of about 0.21 mm (0.090 in.) The actual dimensions of the cross-section will depend upon the size of the vane 122, and the shape of the cross-section may be varied to suit a particular application. For example, the blended corner 154 may have a compound radius, or it could be a non-circular curve. The blended corner 154 is tangent to the flowpath surface 148 and makes a smooth transition to the aft-facing surface 152. Preferably the blended corner 154 is also tangent to the aft-facing surface 152. The exact contour of the blended corner 154 may be determined through known types of analytical tools such as computational fluid dynamics (CFD) software. The blended corner 154 is substantially larger than a standard break-edge radius that would be incorporated for purposes of manufacturing requirements or to avoid stress concentrations, for a given size of vane 122. Increasingly larger radii are believed to be better at keeping the vane exit flow attached to the inner band 146 thereby bringing it further into the purge cavity 128 at a higher swirl. Limitations due to vane throat area design intent requirements may restrict the maximum radius (or curvature transition to aft-facing surface 152) of the blended corner 154. Furthermore, if the higher temperature gas path air induced into the purge cavity is excessive, it may overheat lower temperature capable components.

The inclusion of the blended corner 154 will also reduce the weight of the LPT nozzle relative to prior art components by removing material that would normally be left in place. Furthermore, the blended corner 154 is an axisymmetric feature and is therefore simple to implement into the manufacture of the inner band 146.

The foregoing has described a turbine nozzle for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A turbine assembly for a gas turbine engine, comprising:
  a nozzle segment comprising:
    an airfoil-shaped vane having a root, a tip, a leading edge, a trailing edge and opposed pressure and suction sides; and
    an arcuate inner band attached to said root of said vane, said inner band including an inner flowpath surface bounded at forward and aft ends thereof by a forward-facing surface and an aft-facing surface, respectively;
  a rotatably-mounted turbine blade disposed aft of and in flow communication with said nozzle segment, said turbine blade including an arcuate blade platform defining a second inner flowpath surface; and
  a purge cavity defined between said nozzle segment and said turbine blade, said purge cavity in flow communication with a secondary flowpath of said engine;
  wherein the juncture of said inner flowpath surface and said aft-facing surface of said inner band is contoured so as to induce swirling vane flow into said purge cavity.

2. The turbine assembly of claim 1 wherein said nozzle segment further includes an arcuate outer band segment attached to said tip of said nozzle, said outer band segment having an outer flowpath surface.

3. The turbine assembly of claim 2 wherein a plurality of said nozzle segments are disposed side-by-side to form a circular nozzle ring.

4. The turbine assembly of claim 1 wherein a cross-sectional profile of said juncture is defined by a predetermined circular radius.

5. The turbine assembly of claim 4 wherein said radius is greater than about 0.015 inches.

6. The turbine assembly of claim 1 wherein a cross-sectional profile of said juncture is defined by a compound radius curve.

7. The turbine assembly of claim 1 wherein said blended corner is tangent to said inner flowpath surface.

8. The turbine assembly of claim 7 wherein said blended corner is tangent to said aft facing surface.

* * * * *